（12）United States Patent
Octau et al.

(10) Patent No.: US 12,172,120 B2
(45) Date of Patent: Dec. 24, 2024

(54) PARTICLE-COLLECTING DEVICE AND VEHICLE EQUIPPED WITH SUCH A DEVICE

(71) Applicants: ALSTOM Holdings, Saint-Ouen-sur-Seine (FR); UNIVERSITE POLYTECHNIQUE HAUTS-DE-FRANCE, Valenciennes (FR); Centre national de la recherche scientifique, Paris (FR)

(72) Inventors: Charlène Aline Françoise Octau, Valenciennes (FR); Damien Laurent Henri Meresse, Hordain (FR); Michel Watremez, Avesnes-le-Sec (FR)

(73) Assignees: ALSTOM Holdings, Saint-Ouen-sur-Seine (FR); UNIVERSITE POLYTECHNIQUE HAUTS-DE-FRANCE, Valenciennes (FR); Centre national de la recherche scientifique, Paris (FR)

( * ) Notice: Subject to any disclaimer, the term of this patent is extended or adjusted under 35 U.S.C. 154(b) by 496 days.

(21) Appl. No.: 17/308,790

(22) Filed: May 5, 2021

(65) Prior Publication Data

US 2021/0346836 A1    Nov. 11, 2021

(30) Foreign Application Priority Data

May 7, 2020  (FR) ..................... 20 04548

(51) Int. Cl.
*B01D 47/02* (2006.01)
*B60H 3/06* (2006.01)

(52) U.S. Cl.
CPC ............. *B01D 47/021* (2013.01); *B60H 3/06* (2013.01); *B60H 3/0658* (2013.01)

(58) Field of Classification Search
CPC .............. B01D 47/021; B01D 2247/10; B01D 2247/14
See application file for complete search history.

(56) References Cited

U.S. PATENT DOCUMENTS 3,566,583 A   3/1971  Ashmore
4,924,672 A   5/1990  Sekiya et al.
(Continued)

FOREIGN PATENT DOCUMENTS

EP   1122105 A2   8/2001
FR   2754467 A1   4/1998
(Continued)

OTHER PUBLICATIONS

French Search Report for French Patent Application No. FR 20 04548, dated Nov. 17, 2020 in 2 pages.

*Primary Examiner* — Christopher P Jones
*Assistant Examiner* — Phillip Y Shao
(74) *Attorney, Agent, or Firm* — Knobbe, Martens, Olson & Bear, LLP

(57) ABSTRACT

A device includes a collection channel, a protection channel, and a tank containing a liquid. The collection channel is configured to direct an airflow containing particles from the outside to the interior of the tank. The airflow passes through the liquid and the protection channel, and is connected to an outlet of the tank. The tank includes a barrier configured to prevent liquid spatters from reaching the outlet and to allow the airflow to pass through the tank to the outlet. The protection channel is connected to a source of suction, is configured to direct the flow from the outlet to the source of suction. The protection channel includes a condenser configured to condense a vapor of the liquid and to direct the generated condensate to the tank.

12 Claims, 3 Drawing Sheets

(56) References Cited

U.S. PATENT DOCUMENTS

| | | | |
|---|---|---|---|
| 8,191,691 B2 * | 6/2012 | Gelb | F16D 65/0031 |
| | | | 188/71.6 |
| 9,726,241 B2 * | 8/2017 | Rocca-Serra | F16D 55/225 |
| 2004/0255786 A1 | 12/2004 | Braunmiller | |
| 2008/0029357 A1 * | 2/2008 | Krantz | B60L 15/2036 |
| | | | 219/202 |
| 2010/0024646 A1 * | 2/2010 | Brookman | B01D 47/06 |
| | | | 96/276 |
| 2015/0122601 A1 * | 5/2015 | Rocca-Serra | F16D 55/225 |
| | | | 188/218 A |
| 2015/0233436 A1 * | 8/2015 | Rocca-Serra | F16D 55/225 |
| | | | 188/264 R |

FOREIGN PATENT DOCUMENTS

| | | |
|---|---|---|
| FR | 3070872 A1 | 3/2019 |
| WO | 2019/025991 A1 | 2/2019 |

\* cited by examiner

PARTICLE-COLLECTING DEVICE AND VEHICLE EQUIPPED WITH SUCH A DEVICE

CROSS-REFERENCE TO RELATED APPLICATION

This application claims priority to French Patent Application No. 20 04548 filed on May 7, 2020, the disclosure of which including the specification, the drawings, and the claims is hereby incorporated by reference in its entirety.

FIELD OF THE INVENTION

The present invention relates to a device for collecting particles suspended in the atmosphere, intended to equip a vehicle. The present invention also relates to a vehicle comprising such a collecting device.

BACKGROUND OF THE INVENTION

The operation of numerous types of vehicles involves the emission or release of particles of various sizes into the atmosphere. For instance, the exhaust gases of certain engines comprise solid particles resulting from the combustion of a fuel. Furthermore, the braking systems used in these vehicles frequently employ the friction of two parts against one another to dissipate the kinetic energy of the vehicle. Friction is thus also the cause of the release of particles into the atmosphere.

The presence of such particles in the atmosphere is likely to induce a large number of illnesses among the people who inhale those particles. This phenomenon is even more significant when the particle concentration is high. Consequently, transport systems in confined environments, particularly subways, are especially sensitive to these effects, because the air is refreshed less often in tunnels than on the surface.

It is also notable that the size of the particles generated either by fuel combustion or by braking may vary, and particularly may be very small. Very fine particles may penetrate quite deeply into the lungs and cause numerous illnesses there.

In particular, very fine particles of the sizes PM 10 or PM 2.5, meaning that they have a diameter of less than or equal to 10 micrometers (μm) or 2.5 μm respectively, are difficult to trap in filters, because filters that can retain such small particles tend to clog easily. Regular maintenance is therefore necessary to keep the filter effective over time, which is difficult when the filter is part of a device embedded in a vehicle.

Furthermore, the passage of air through filters that have meshes of very small size leads to significant pressure drops, and the effectiveness of the suction is therefore limited. This phenomenon is even more significant when the filter is partially clogged, which happens very quickly due to the small size of the meshes. However, even a new, clean filter poses a non-negligible obstacle to the passage of air. A very-small-particle-collecting system using a filter therefore consumes a lot of energy. When the particle-collecting device is embedded within a vehicle, this becomes problematic because the quantity of energy available is limited.

SUMMARY OF THE INVENTION

There is therefore a need for a system to collect particles suspended in the atmosphere, intended to be installed in a vehicle, which is capable of collecting particles of very small size while requiring little maintenance and consuming little energy.

To that end, a device for collecting suspended particles is proposed, intended to be installed in a vehicle, the device comprising a collection channel, a tank, and a protection channel, the tank being configured to contain a liquid, the collection channel being configured to direct an airflow containing particles from the outside of the collection device to the interior of the tank, the airflow successively passing through the collection channel, the tank, and the protection channel, the collection channel, the tank, and the protection channel being configured so that the airflow passes through the liquid, the protection channel being connected to an outlet of the tank, the outlet being disposed above the level of the liquid in the tank, the tank further comprising a barrier configured to prevent liquid spatters from reaching the outlet of the tank, the barrier being configured to allow the airflow to pass through the tank from the collection channel to the outlet, the protection channel being configured to be connected to a source of suction capable of generating the airflow, the protection channel being configured to direct the flow from the outlet of the tank to the source of suction, the protection channel comprising a condenser configured to condense a vapor of the liquid present within the airflow and to direct the generated condensate from the condenser to the tank.

According to particular embodiments, the device has one or more of the following features taken in isolation or in any combination that is technically possible:

- the tank further comprises a condensate return opening, the return opening being distinct from the outlet, the protection channel comprising a return conduit configured to direct the condensate to the tank via the return opening.
- the return conduit comprises a check valve to prevent a fluid from circulating from the tank to the condenser within the return conduit.
- the protection channel further comprises a filter configured to retain particles found in the airflow, the filter being interposed between the condenser and the source of suction when the protection channel is connected to the source of suction.
- the barrier comprises a grille, the grille particularly delimiting openings having an area of between 0.5 mm$^2$ and 2 mm$^2$.
- the barrier divides a chamber of the tank into a first compartment and a second compartment, the first compartment being configured to house the liquid, the outlet opening into the second compartment, the barrier delimiting a passage connecting the first compartment to the second compartment and configured to be traversed by the airflow.
- the protection channel comprises a suction conduit intended to connect to the protection channel to the source of suction, the suction conduit comprising a check valve configured to prevent an airflow from circulating through the check valve from the source of suction to the protection channel.
- the liquid is an aqueous solution, the solution particularly containing a surfactant.
- the tank comprises at least two chambers connected serially, each chamber containing liquid, the collection channel being configured to inject the collection airflow into the liquid contained in one of the chambers, the outlet opening into another chamber.

Further proposed is a mass transit vehicle comprising a source of suction and a collection device as previously described, the collection device particularly being configured to collect particles emitted when the vehicle is braking.

According to one particular embodiment, the vehicle comprises a pneumatic circuit and a brake, the pneumatic circuit being configured to control braking of the vehicle by the brake, the source of suction being configured to be actuated by the pneumatic circuit.

BRIEF DESCRIPTION OF THE DRAWINGS

Characteristics and advantages of the invention will become apparent upon reading the following description, given only as a nonlimiting example, referring to the attached drawings, in which.

DETAILED DESCRIPTION OF PREFERRED EMBODIMENTS

Figure 1:
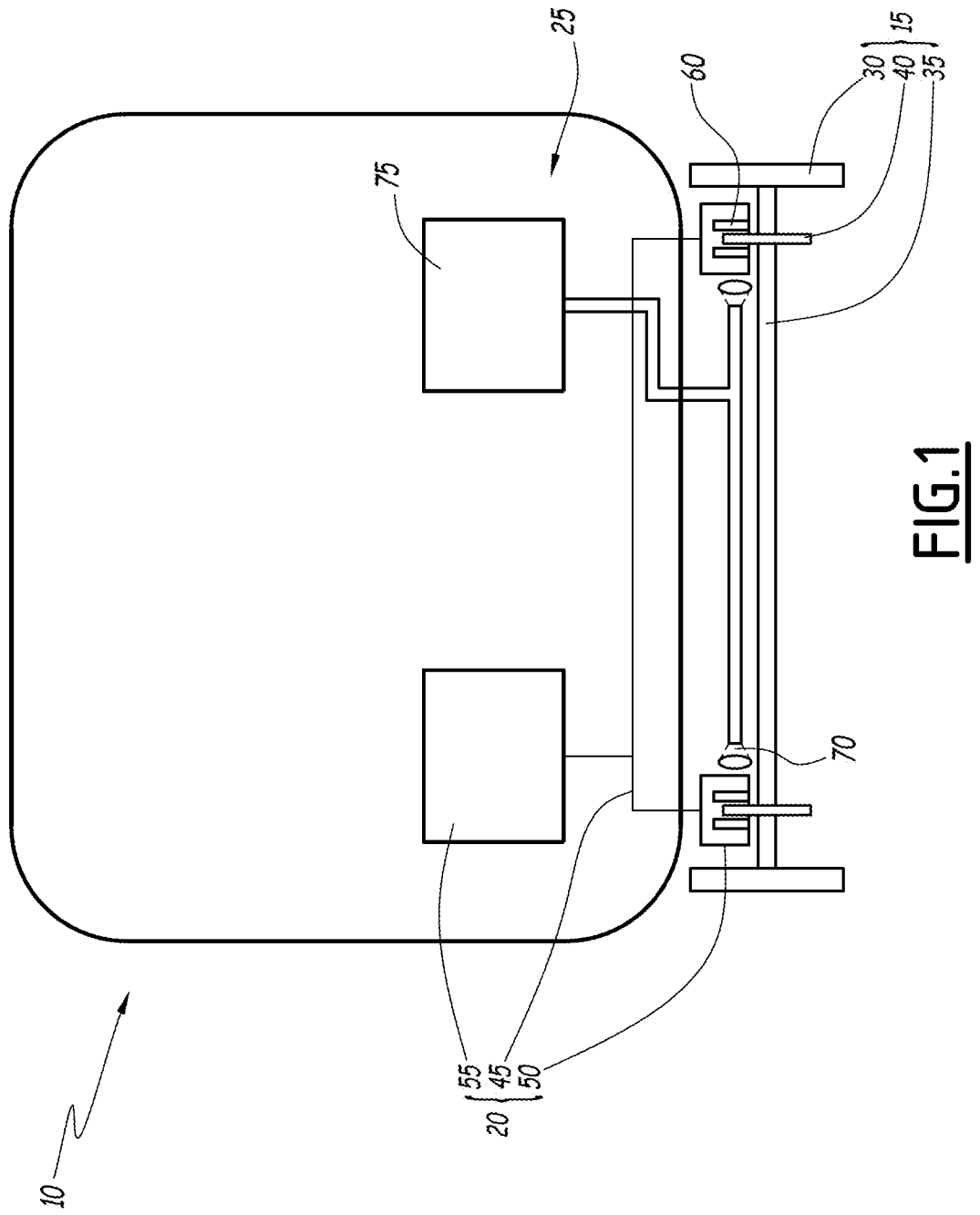
FIG. 1 is a schematic depiction of a vehicle comprising a particle-collecting device according to the invention.

A vehicle 10 is schematically depicted in FIG. 1.

The vehicle 10 is, for instance, a mass transit vehicle, in particular a railway vehicle such as a train, tram, subway, or a car forming part of such a train, tram, or subway. In one variant, the vehicle 10 is a land vehicle such as a bus or trolleybus, or a personal vehicle.

The vehicle 10 comprises at least one axle 15, a braking system 20, and a collection device 25.

In a manner known per se, each axle 15 comprises at least two wheels 30 connected by a shaft 35, at least one disc 40, also called a brake disc, for example two discs 40, being mounted on the shaft 35.

Each disc 40 is rigidly connected to the corresponding shaft 35.

The braking system 20 comprises a pneumatic circuit 45 and at least one brake 50, particularly a brake 50 for each of the discs 40.

The pneumatic circuit 45 is configured to control braking of the vehicle 10 by the brake(s) 50. In particular, the pneumatic circuit 45 is configured to provide each brake 50 with pressure suitable to actuate the brake 50 so as to cause the vehicle 10 to be braked by the brake 50.

It should be noted that variants in which the brakes 50 are actuated electrically or hydraulically are also possible.

The pneumatic circuit 45 particularly comprises a braking control device 55. This control device 55 is configured to manage an airflow under pressure and to transmit the airflow, via a series of conduits, to each brake 50.

Each brake 50 is configured to exert upon the corresponding disc 40 a force intended to prevent the disc 40 from rotating. In particular, each brake 50 comprises at least one pad 60 configured to rub against the disc 40 so as to prevent or slow the rotation of the disc 40.

In particular, the brake 50 is configured to move each pad 60, under the effect of the pressure transmitted by the pneumatic circuit 45, between a position in which the pad 60 is not in contact with the pneumatic disc 40 and a position in which the pad 60 is resting against the disc 40.

The collection device 25 is configured to collect particles suspended in the atmosphere, in particular the atmosphere surrounding the vehicle 10.

For instance, the collection device 25 is configured to collect suspended particles emitted when a vehicle 10 brakes, particularly particles resulting from wear to a disc 40 and/or a pad 60 when the pad 60 rubs against the disc 40.

It should be noted that the collection device 25 may also be used to collect other types of particles, such as by altering the positioning of all or part of the collection device 25 within the vehicle 10.

Each particle has a maximum dimension less than or equal to 100 µm, for instance less than or equal to 50 µm, particularly less than or equal to 10 µm, and especially less than or equal to 2.5 µm.

Figure 2:
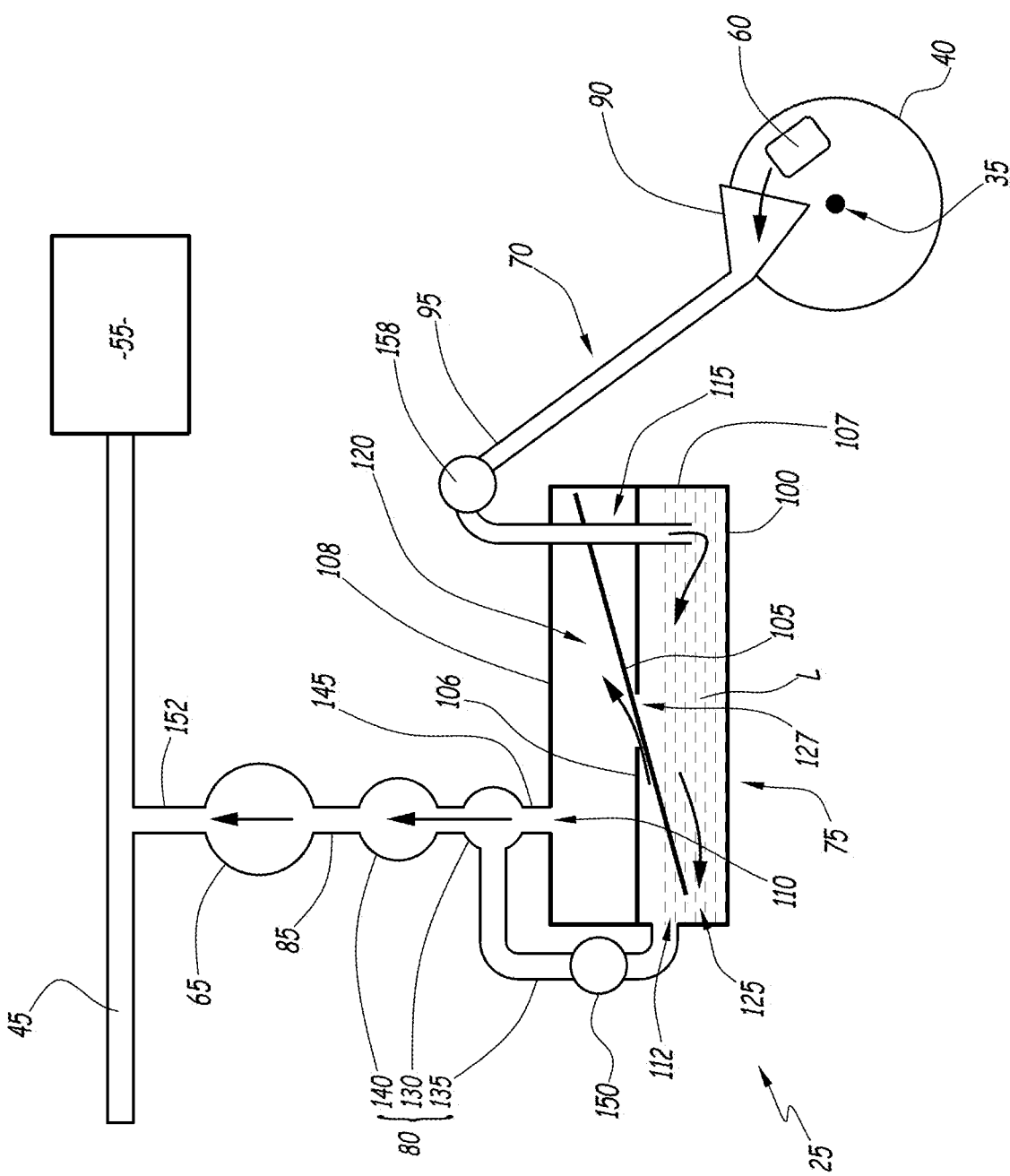
FIG. 2 is a schematic depiction of a first example of a particle-collecting device of FIG. 1.

A first example of a collection device 25 is depicted in FIG. 2.

The collection device 25 comprises a source of suction 65, a collection channel 70, a tank 75, and a protection channel 80.

The source of suction 65 is configured to generate a collection airflow. In particular, the source of suction 65 is configured to suck in a collection airflow.

The source of suction 65, the collection channel 70, the tank 75, and the protection channel 80 are configured to direct the collection airflow from outside the collection device 25, particularly from outside the vehicle 10, to the source of suction 65.

In particular, the source of suction 65, the collection channel 70, the tank 75, and the protection channel 80 are configured so that the collection airflow passes through, in this order, the collection device 70, the tank 75, and the protection channel 80, to reach the source of suction 65. This is indicated by arrows in FIG. 2.

Thus, the source of suction 65 is connected to the protection channel 80, for instance by a suction conduit 85.

Optionally, the suction conduit 85 comprises a check valve configured to enable the collection airflow to circulate through the check valve from the protection channel 80 to the source of suction 65, and to prevent an airflow from circulating from the source of suction 65 to the protection channel 80. The check valve may be placed on the suction conduit 85 between the protection channel 80 and the source of suction 65, but also, optionally, between the source of suction 65 and the pneumatic circuit 45.

The source of suction 65 is, for instance, configured to be actuated by the pneumatic circuit 45. In such a case, the source of suction 65 is connected to the pneumatic circuit 45 by a conduit 152.

According to one embodiment, the source of suction 65 comprises a turbine capable of generating the collection airflow when the turbine is actuated by the airflow under the pressure circulating within the pneumatic circuit.

In one variant, the source of suction 65 is configured to generate the collection airflow by the Venturi effect. For instance, the source of suction 65 is connected by the conduit 152 to a pneumatic circuit zone 45 in which a local reduction in the diameter of the circuit 45 leads to a local decrease in pressure. The collection airflow is then sucked and injected into the airflow under pressure.

It should be noted that numerous types of source of suctions 65 may be used. In particular, numerous types of source of suctions 65 can be actuated by a pneumatic circuit 45 cause the collection airflow to be injected into the pneumatic circuit 45. For instance, the source of suction is a pneumatic, hydraulic, or electric vacuum pump.

Optionally, a cooler is configured to cool the air flow that circulates within the conduit 152 from the source of suction 65, before the airflow circulates into the pneumatic circuit 45.

In other possible embodiments, the source of suction 65 may be disconnected from the pneumatic circuit 45, for instance if the source of suction 65 is actuated electrically or by a non-pneumatic means.

The collection airflow contains a number of particles that the collection device 25 is configured to collect.

The collection channel 70 is configured to collect the collection airflow from outside of the collection device 25, particularly from outside the vehicle 10, and to direct the collection airflow into the tank 75.

In particular, the collection channel 70 is configured to collect particles emitted when braking the vehicle 10, particularly so that the collection airflow is in contact with a pad 60 and/or with a disc 40 before penetrating into the collection channel 70.

The collection channel 70 comprises, for instance, a tip 90, a collection conduit 95, and a check valve 158.

The tip 90 is configured to collect the collection airflow and to transmit the collection airflow to the collection conduit 95.

The tip 90, is, for instance, flared at one of its ends, that end being open and disposed near the disc 40 and/or near at least one corresponding pad 60.

The collection conduit 95 is configured to receive the collection airflow from the tip 90 and to direct the collection airflow from the tip 90 into the tank 75. In particular, the collection conduit 95 is inject the collection airflow into the liquid L.

The check valve 158 is configured to enable the collection airflow to travel through the check valve 158 from the tip 90 to the tank 75 and to prevent the airflow from circulating, through the collection conduit 95, from the tank 75 to the tip 90. The check valve 158 particularly makes it possible to avoid any phenomena in of evaporation during the period when the device 25 is not in use.

The tank 75 is configured to contain a liquid L.

In particular, the tank 75 is configured to contain a volume of liquid L, that volume of liquid L being dependent upon the dimensions of the brake and the maintenance frequencies of the collection device 25.

The tank 75, the collection channel 70, and the protection channel 80 are configured so that the collection airflow passes through the liquid L when the collection airflow passes through the tank 75.

The term "passes through the liquid L" means that the collection airflow circulates through at least part of the liquid L and is in contact with the liquid L during that circulation.

For instance, the collection channel 70 is configured to inject the collection airflow into the liquid L. To do so, the collection channel 70 is particularly configured so that a first end of the collection conduit 95 is submerged in the liquid L, a second end of the collection conduit 95 being provided to receive the collection airflow from the tip 90, the collection airflow circulating within the collection conduit from the second end to the first end.

The tank 75 comprises, in particular, a housing 100 and a barrier 105.

The housing 100 delimits a chamber intended to contain the liquid L.

The housing 100 separates the exterior of the tank 75 from the interior of the tank 75. The housing 100 is, for instance, made of a metallic material such as stainless steel, or of a plastic material depending on the environment of the vehicle 10. The material of the housing 100 is therefore to be adapted to the environment, particularly if the vehicle 10 circulates in regions with an extreme climate or if other equipment located near the collection device 25 may disrupt its operation.

The housing 100 comprises at least one side face 107 and at least one upper face 108. The side face(s) 107 delimit(s) the tank 75 in a horizontal plane when the vehicle 10 is running. The upper face 108 delimits the tank 75 in a vertical direction when the vehicle 10 is running.

The housing 100 delimits at least one outlet 110 of the tank 75 and a return opening 112.

Furthermore, an orifice (not depicted) for filling and/or draining the tank 75 is also built into the housing 100.

The outlet 110 is configured to enable the collection airflow to circulate from the tank 75 to the protection channel 80 by passing through the outlet 110.

The outlet 110 is disposed above the level of liquid L in the tank 75. In other words, the outlet 110 is not submerged in the liquid L. For instance, the outlet 110 is built into the upper face 108 of the housing 100.

The return opening 112 is distinct from the outlet 110. For instance, the return opening 112 is built into a side face 107.

The barrier 105 is configured to prevent spatters of liquid L from reaching the outlet 110.

Furthermore, the barrier 105 is configured to enable the collection airflow to pass through the tank 75 from the collection channel 70 to the outlet 110.

The barrier 105 comprises, for instance, a plate made of a metallic or plastic material. In one variant, the barrier 105 comprises a grille delimiting a plurality of openings. The openings each have an area of, for instance, between 0.5 square millimetres ($mm^2$) and 2 $mm^2$, for instance equal to 1 $mm^2$, within 10%.

For example, the barrier 105 divides the tank 75 into a first compartment 115 and a second compartment 120 and delimits a passage 125 connecting the first compartment 115 to the second compartment 120.

The passage 125 is delimited by the barrier 105 and by a side face 107. The passage 125 is intended to be passed through by the collection airflow.

The barrier 105 extends, for instance, between a first end fastened to a side wall 107 or to the upper wall 108 and a second end delimiting the passage 125.

The first end is disposed at a height greater than a height of the second end, each height being measured in a vertical direction from the same horizontal plane.

For instance, the first end is disposed above the level of the liquid capital L and the second end is disposed below the level of the liquid L. In other words, the first end is surfaced and the second end is submerged. Thus, the passage 125 is submerged in the liquid L.

Optionally, the barrier 105 may be supplemented by another barrier 106.

The barrier 106 comprises, for instance, two plates delimiting a passage 127 between them. The barrier 105 extends through the passage 125. Thus, one of the two plates of the barrier 106 is disposed in one of the compartments 115, 120, while the other of the two plates is disposed in the other compartment 115, 120.

The barrier 106 is interposed between the liquid L and the outlet 110.

The two plates of the barrier 106 both extend, for instance, from one side face 107 to another side face 107, those two side faces 107 being across from one another.

In particular, the barrier 106 is placed over the return opening 112 and extends above the surface of the liquid L.

The plates of the barrier 106 are, for instance, horizontal when the vehicle is running on horizontal terrain. In one variant, the plates of the barrier 106 are each inclined from one end of the plate in contact with a side face 107 to another end delimiting the passage 127. This particularly enables the liquid L, which may be spattered when the vehicle is running, from going back into the tank 75.

The barrier 106 is made, for instance, from a metallic or plastic material.

Each plate of the barrier 106 is, for instance, a solid plate, particularly an unperforated one. In one variant, at least one of the plates of the barrier 106 is perforated and delimits a plurality of openings. In other words, the plate in question is a grille. The openings each have an area of, for instance, between 0.5 square millimetres ($mm^2$) and 2 $mm^2$.

The first compartment 115 is configured to at least partially accommodate the liquid L.

The collection channel 70 is configured to inject the collection airflow into the first compartment 115, particularly in the liquid L, contained in the first compartment 115.

The second compartment 120 is at least partially filled with air. In particular, the second compartment 120 is not entirely filled with liquid L.

The outlet 110 opens into the second compartment 120.

Thus, the tank 75 is configured so that the collection airflow successively circulates through the first compartment 115 (particularly through the liquid L contained in the first compartment 115), through the passage 125, and through the second compartment 120 to reach the outlet 110.

The liquid L is, for instance, an aqueous solution. In particular, the liquid L contains a surfactant. For instance, the liquid L is a mixture of water and a surfactant.

It should be noted that numerous types of liquids L may be used.

The term "surfactant" particularly refers to a compound capable of altering the surface tension of an interface between air and water, or between air and an aqueous solution. The word "surfactant" is sometimes replaced by the synonym "surface-active agent".

The term "aqueous solution" particularly refers to a liquid L containing water, particularly a liquid L containing, by mass, at least 80% water, for instance at least 95% water The protection channel 80 is connected to the source of suction 65 and is configured to direct the collection airflow from the outlet 110 to the source of suction 65.

The protection channel 80 is configured to condense a vapor from the liquid L found in the collection airflow and to direct the generated condensate to the tank 75.

The protection channel 80 comprises a condenser 130 and a return conduit 135. Optionally, the protection channel 80 further comprises a filter 140. In particular, the filter 140 is interposed between the condenser 130 and the source of suction 65, the condenser 130 being interposed between the filter 140 and the outlet 110 of the tank 75.

The condenser 130 is configured to be traversed by the collection airflow and to condense the vapor found in the collection airflow.

The condenser 130 is, for instance, a separated-fluid condenser. Separated-fluid condensers are condensers that comprise a coolant circuit, in which the collection airflow is separated from the coolant.

The condenser 130 is, for instance, connected to the outlet 110 by a conduit 145. The conduit 145 is distinct from the return conduit 135.

Additionally, the condenser 130 is configured to inject or guide the condensate to the return conduit 135.

The return conduit 135 connects the condenser 130 to the return opening 112. In particular, the return conduit 135 is configured to direct the condensate from the condenser 130 to the tank 75 via the return opening 112.

The return conduit 135 comprises, for instance, a check valve 150 configured to be passed through by the condensate when the condensate is circulating from the condenser 130 to the tank 75 and configured to prevent a fluid, particularly the liquid L and/or the collection airflow, from circulating in the return conduit 135 from the tank 75 to the condenser 130.

Optionally, a level control system for the liquid L in the tank 75 as well as a reserve tank of the liquid L may be added to keep the level of liquid L constant.

The filter 140 is configured to retain the particles found in the collection airflow. For instance, the filter 140 comprises at least one grille provided to be passed through by the collection airflow, the meshes of the grille having a dimension less than or equal to the maximum dimension of the particles.

The filter 140 is particularly configured to retain particles having a size greater than or equal to 15 μm, for instance greater than or equal to 40 μm.

The operation of the collection device 25 will now be described.

The source of suction 65 generates negative pressure that causes the appearance of the collection airflow.

The collection airflow successively passes through the tip 90, the collection conduit 95, the tank 75, the conduit 145, the condenser 130, the filter 140 if any, and the suction conduit 85 on its way to the source of suction 65.

The collection airflow, because it is collected near a brake pad 60, drags along with it particles emitted during braking. Furthermore, the collection airflow naturally drags along with it any other type of particles suspended in the air in the immediate vicinity of the tip 90.

The collection airflow is directed by the collection channel 70 to the tank 75. In the tank 75, the collection airflow passes at least partially through the liquid L.

Most of the particles found in the collection airflow become trapped in the liquid L when the collection airflow passes through it.

Due to the presence of the barrier 105, the liquid L found in the tank does not reach the outlet 110 even when agitated by the movement of the vehicle 10 or the suction of the device 65. This therefore keeps the liquid L from being sucked to the condenser 130 and/or the source of suction 65, thereby reducing the risk of the liquid L damaging the source of suction 65 and/or the pneumatic circuit 45, and advantageously the filter 140.

The collection airflow then reaches the condenser 130 via the outlet 110.

It should be noted that the collection airflow exhibits, at the outlet of the tank 75, a non-zero vapor mass fraction of the liquid L, because the collection airflow became loaded with vapor when passing through the liquid L. Furthermore, the collection airflow frequently contains a non-zero mass fraction of vapor when it is collected by the collection channel 70. Likewise, in the event of high heat, the collection airflow contains a non-zero mass fraction of vapor when it is contained in the tank 75.

The term "mass fraction" means a ratio between, as the denominator, a mass of a volume of the collection airflow and, as the numerator, the mass of the vapor contained within that volume.

The vapor contained in the collection airflow is at least partially condensed in the condenser 130. The condensed vapor forms a condensate in liquid form.

In particular, the specific humidity of the air exiting the condenser 130 must be less than 5 grams of water per kilogram of dry air in order to avoid condensation within the pneumatic system. This corresponds to a dew point of 4° C.

Upon exiting the condenser 130, the condensate is directed to the tank 75 by the return conduit 135.

Upon exiting the condenser 130, the collection airflow reaches the source of suction 65, which injects the collection airflow into the pneumatic circuit 45.

Owing to the invention, the particles are collected without too large of a pressure drop taking place. This is because the liquid L effectively traps the particles contained in the collection airflow without leading to an excessive pressure drop. Furthermore, the liquid L can easily be changed once it has become saturated with particles, but this saturation takes a long time to achieve, particularly if the volume of liquid L is large.

Furthermore, the presence of the condenser 130 makes it possible to keep the level of liquid L in the tank 75 from falling too quickly due to the evaporation caused by the collection airflow. Thus, the maintenance of the collection device 25 remains limited.

The barrier 105 also limits the losses of liquid L, and keeps the presence of liquid L downstream of the tank 75 from causing excessive pressure drops, which would limit the energy efficiency of the collection device 25. Furthermore, the liquid L could limit the effectiveness of the condenser 130 if present in too great a quantity.

The use of a return opening 112 distinct from the outlet 110, and therefore of a return conduit 135 distinct from the conduit 145 means that the condensate does not travel within the same conduit 145 as the collection airflow. This makes it possible to reduce the pressure drops that the collection airflow undergoes, thereby increasing the energy efficiency of the collection device 25.

The check valve 150, too, keeps the liquid L from reaching the source of suction 65.

The filter 140, although optional, keeps particles that would not have been trapped by the liquid L from reaching the source of suction 65 and/or the pneumatic circuit 45 and damaging either one of them.

A barrier 105 separating the tank into two compartments and delimiting a passage connecting those two compartments effectively blocks spatter coming from either of the compartments, and is easy to manufacture and implement. In particular, the barrier 105 may in such a case take the form of a simple plate or grille having openings whose area is between 0.5 mm² and 2 mm².

The presence of a check valve on the suction conduit 85 or upstream of the source of suction 65 makes it possible to keep an airflow or any other gas from circulating from the source of suction 65 to the collection channel 70, e.g. if the source of suction 65 were to malfunction. Such a flow would particularly cause the ejection of part of the liquid L out from the tank 75, or even out from the collection device 25, and may therefore render that device 25 ineffective. Furthermore, the presence of a check valve 158 on the collection conduit 95 also makes it possible to prevent the ejection of the liquid L or the loss of liquid L vapor in the event of high heat caused by the presence of equipment near the tank 75 or by weather conditions.

The use of an aqueous solution as the liquid L makes it easier to replace the liquid L and avoids the complexity inherent in using another type of liquid L that would be harder to produce or procure, or would pollute. The manufacturing and maintenance of the collection device 25 is therefore made easier.

A surfactant is used to more effectively trap the particles in the liquid L by clumping them. A surfactant may particularly be a flocculant.

The use of the pneumatic circuit 45 to actuate the source of suction 65 enables greater simplicity of the vehicle 10 because such a pneumatic circuit is frequently already present in the vehicle 10. This also means there is no need to add further equipment that would weigh down or encumber the vehicle 10.

It should be noted that other embodiments in which the tank 75, collection channel 70, and protection channel 80 are configured so that the collection airflow passes through the liquid L are possible.

For instance, the barrier 105 comprises a grille interposed between the liquid L and the outlet 110, the grille delimiting openings of between 0.5 mm² and 2 mm². In such a case, it is not necessary for the barrier 105 to delimit a passage 125 because the grille may be passed through by the collection airflow while blocking the passage of drops or spatters caused by agitation in the tank 75. Additionally, the presence of the barrier 106 in addition to the barrier 105 makes it possible to improve the confinement of the liquid L so that it does not reach the outlet 110.

In such a case, the barrier 105 is normally horizontal when the vehicle 10 is running. In one variant, the grille partially obstructs the outlet 110, for instance by being fastened onto the upper face 108.

A second example vehicle 10 will now be described. Elements identical to the first example are not described again. Only differences are highlighted.

Figure 3:
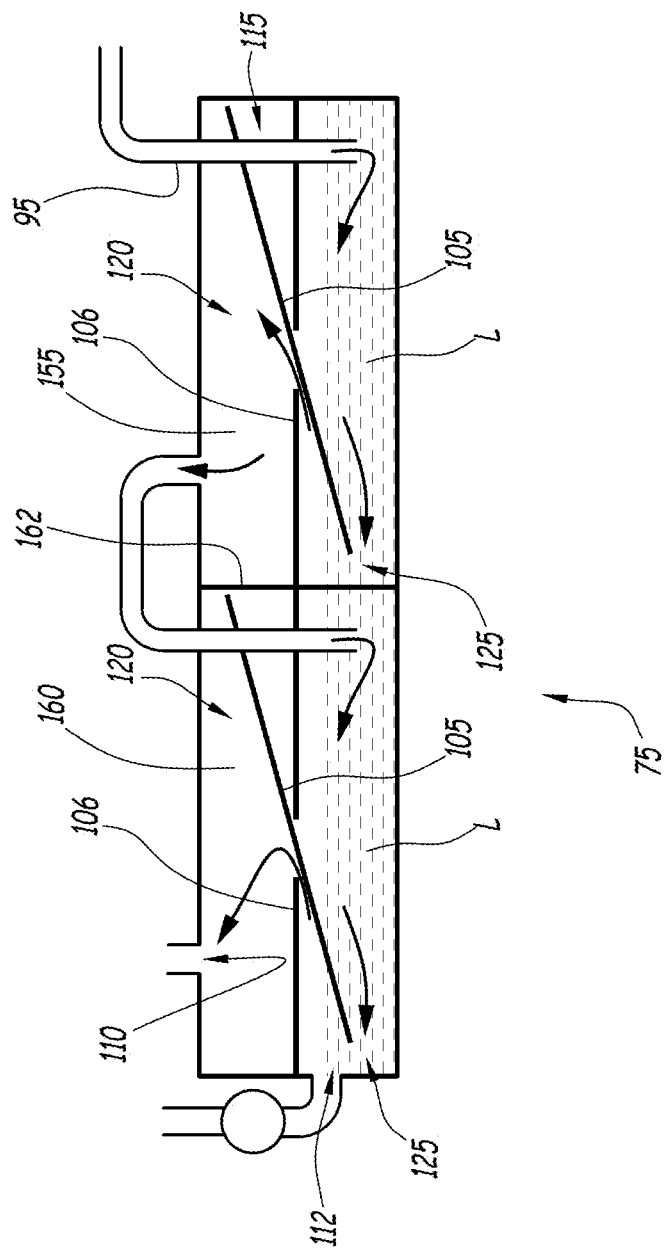
FIG. 3 is a schematic depiction of a second example of a particle-collecting device of FIG. 1.

The collection device 25 of the second example is depicted in FIG. 3.

The tank 75 comprises a plurality of distinct chambers, for instance two chambers 155 and 160. Each chamber is, for instance, delimited by a respective housing 100.

In one variant, at least two chambers 155, 160 are delimited by the same housing 100, as is the case in FIG. 3. In such a case, the housing 100 comprises, for instance, a barrier 162, particularly a vertical one, separating the two chambers from one another.

Each chamber 155, 160 contains liquid L, in a manner similar to the first example of FIG. 2.

Each chamber 155, 160 is, for instance, separated into two compartments 115, 120 by a barrier 105, and optionally contains a barrier 106.

The collection channel 70 is configured to inject the collection airflow into the first compartment 115 of the chamber 155.

The outlet 110 connects the second compartment 120 of the chamber 160 to the condenser 130.

The return opening 112 connects the return conduit 135 to the chamber 160.

The second compartment 120 of the chamber 155 is connected by a linking conduit 165 to the first compartment 115 of the chamber 160.

The linking conduit 165 is particularly configured to inject the collection airflow into the liquid L contained within the first compartment 115 of the chamber 160.

When the collection airflow circulates through the tank 75, the collection airflow is injected by the collection channel 70 into the liquid L contained within the first compartment 115 of the chamber 155.

The collection airflow then successively passes through the passage 125 and the second compartment 120 of the chamber 155 and the linking conduit 165, is then injected by the linking conduit 165 into the liquid L contained within the first compartment 115 of the chamber 160 and passes through the passage 125 and the second compartment 120 of the chamber 160 to reach the outlet 110.

The second example collection device 25 makes it possible to concentrate the majority of collected particles in the liquid L contained within the chamber 155. It is therefore less frequently necessary to replace the liquid L in the chamber 160, and the quantities of liquid L consumed when using the vehicle 10 are therefore reduced relative to the first example.

In one variant or as a complement, either one of the previous example collection devices 25 comprises multiple collection channels 70, for instance each associated with a separate location of the vehicle 10, particularly each associated with a respective disc 40 and/or one or more distinct pad(s).

What is claimed is:

1. A mass transit vehicle comprising a source of suction and a collection device, said collection device comprising a collection channel, a tank, and a protection channel, the tank being configured to contain a liquid, the collection channel being configured to direct an airflow containing particles from the outside of the collection device to the interior of the tank, the airflow successively passing through the collection channel, the tank, and the protection channel, the collection channel, the tank, and the protection channel being configured so that the airflow passes through the liquid, the protection channel being connected to an outlet of the tank, the outlet being disposed above the level of the liquid in the tank, the tank further comprising a first barrier configured to prevent liquid spatters from reaching the outlet of the tank, the first barrier being configured to allow the airflow to pass through the tank from the collection channel to the outlet, wherein the protection channel is configured to be connected to a source of suction capable of generating the airflow, the protection channel being configured to direct the flow from the outlet of the tank to the source of suction, the protection channel comprising a condenser configured to condense a vapor of the liquid present within the airflow and to direct the generated condensate from the condenser to the tank, wherein the mass transit vehicle further comprises a brake disc and a pad of a brake, and the collection device is connected to the brake disc through the collection channel such that the collection device collects the airflow containing the particles resulting from wear to the brake disc and/or the pad of the brake when the vehicle brakes and the pad of the brake rubs against the brake disc, wherein the outlet of the tank is a conduit that connects the tank to the condenser, and the first barrier is disposed between the outlet and the liquid contained in the tank.

2. A mass transit comprising a source of suction and a collection device, said collection device comprising a collection channel, a tank, and a protection channel, the tank being configured to contain a liquid, the collection channel being configured to direct an airflow containing particles from the outside of the collection device to the interior of the tank, the airflow successively passing through the collection channel, the tank, and the protection channel, the collection channel, the tank, and the protection channel being configured so that the airflow passes through the liquid, the protection channel being connected to an outlet of the tank, the outlet being disposed above the level of the liquid in the tank, the tank further comprising a barrier configured to prevent liquid spatters from reaching the outlet of the tank, the barrier being configured to allow the airflow to pass through the tank from the collection channel to the outlet, wherein the protection channel is configured to be connected to a source of suction capable of generating the airflow, the protection channel being configured to direct the flow from the outlet of the tank to the source of suction, the protection channel comprising a condenser configured to condense a vapor of the liquid present within the airflow and to direct the generated condensate from the condenser to the tank, the mass transit vehicle further comprising a pneumatic circuit and a brake, the pneumatic circuit being configured to control braking of the vehicle by the brake, the source of suction being configured to be actuated by the pneumatic circuit.

3. The mass transit vehicle according to claim 1, wherein the tank further comprises a condensate return opening, the return opening being distinct from the outlet, the protection channel comprising a return conduit configured to direct the condensate to the tank via the return opening.

4. The mass transit vehicle according to claim 3, wherein the return conduit comprises a check valve configured to prevent a fluid from circulating from the tank to the condenser within the return conduit.

5. The mass transit vehicle according to claim 1, wherein the protection channel further comprises a filter configured to retain particles found in the airflow, the filter being interposed between the condenser and the source of suction when the protection channel is connected to the source of suction.

6. The mass transit vehicle according to claim 1, wherein the barrier comprises a grille, the grille particularly delimiting openings having an area of between 0.5 mm$^2$ and 2 mm$^2$.

7. The mass transit vehicle according to claim 1, wherein the barrier divides a chamber of the tank into a first compartment and a second compartment, the first compartment being configured to house the liquid, the outlet opening into the second compartment, the barrier delimiting a passage connecting the first compartment to the second compartment and configured to be traversed by the airflow.

8. The mass transit vehicle according to claim 1, wherein the protection channel comprises a suction conduit that connects the protection channel to the source of suction, the suction conduit comprising a check valve configured to prevent an airflow from circulating through the check valve from the source of suction to the protection channel.

9. The mass transit vehicle according to claim 1, wherein the liquid is an aqueous solution.

10. The mass transit vehicle according to claim 9, wherein the solution contains a surfactant.

11. The mass transit vehicle according to claim 1, wherein the tank comprises at least two chambers connected serially, each chamber containing liquid, the collection channel being configured to inject the collection airflow into the liquid contained in one of the chambers, the outlet opening into another chamber.

12. The mass transit vehicle according to claim 1, further comprising a second barrier having a first end and a second end, wherein the first end of the second barrier is disposed above a level of the liquid contained in the tank, and the second end of the second barrier is disposed below a level of the liquid contained in the tank.

* * * * *